United States Patent [15] 3,687,894
Collings et al. [45] Sept. 29, 1972

[54] A COMPOSITION OF A LIQUID EPOXY RESIN, A POLYHYDROXYL MATERIAL AND A HARDENER

[72] Inventors: William G. Collings, 38 Greentwig Dr.; Anthony N. Cianciarulo, 61 Shady Nook Dr., both of Toms River, N.J. 08753; Kwan-Tin Shen, 1212 Tuxedo Terrace, Lakewood, N.J. 08701

[22] Filed: July 23, 1970

[21] Appl. No.: 57,764

[52] U.S. Cl.............260/47 EC, 117/124 E, 117/127, 117/138.8 R, 117/142, 117/148, 117/161 ZB, 161/184, 161/185, 260/2 N, 260/2 EC, 260/18 EP, 260/29.2 EP, 260/32.6 R, 260/32.8 EP, 260/33.4 EP, 260/37 EP, 260/47 EN, 260/59, 260/79, 260/15 EP, 260/88.3 A, 260/831, 260/835
[51] Int. Cl. ............................................C08g 30/14
[58] Field of Search....260/2 EP, 2 EC, 2 EN, 47 EP, 260/47 EC, 47 EN, 59; 117/124, 18 EP, 830, 830 TW, 88.3 A, 75 EP, 32.6 R

[56] References Cited

UNITED STATES PATENTS 2,928,811  3/1960  Belanger................260/47 EP
3,308,094  3/1967  Sherr......................260/47 EP
3,530,093  9/1970  Maurer...................260/47 EP Primary Examiner—William H. Short
Assistant Examiner—T. Pertilla
Attorney—Harry Goldsmith, Joseph G. Kolodny and Mario A. Monaco

[57] ABSTRACT

Novel compositions and methods are presented for one step simultaneous advancement and B staging or curing of liquid epoxy resins. The methods involve forming a composition of the liquid epoxy resin, a hydroxyl containing material reactable therewith at elevated temperatures and a hardener therefor guanidine or its derivatives, applying the mixture to a suitable substrate and subjecting the composite to elevated temperatures. The compositions are useful for impregnation of substrates such as fiber glass for the production of laminates.

10 Claims, No Drawings

COMPOSITION OF A LIQUID EPOXY RESIN, A POLYHYDROXYL MATERIAL AND A HARDENER

This invention relates to the production of hardenable epoxide compositions. More particularly, it relates to the formation of epoxide resin compositions which can be brought to a final usable state in a relatively short time.

BACKGROUND OF THE INVENTION

Compositions containing epoxy resins are normally converted into useable polymeric forms by curing the resin with suitable curing agents. During the curing or polymerization process, the composition undergoes a complex series of chemical changes resulting in an ultimate form having properties which depend in large amount on the type of resin used, the amount and kind of curing agents, catalysts, hardners, retarding agents employed, and the particular conditions of time and temperature of curing. Products ranging from soft, flexible materials to rigid infusible materials can be obtained using the proper balance of parameters and ingredients above referred to. Such products find use in many applications where adhesives, laminates, coatings and the like are employed.

Of course, since the properties of the final product will depend in large measure on the properties of the starting resin, the art has come to recognize and utilize certain types of resins for certain applications. In the laminating field for example, that is, where various types of materials such as fiberglass are impregnated with epoxy resins and several layers of such impregnated materials are formed into an integrated structure, the art has found that solid resins usually offer the most suitable characteristics. These resins are characterized as G–10 resins or as FR–4 resins by NEMA, the National Electrical Manufacturers Association.

Typically the art process for preparing such solid resins involves selecting an appropriate liquid epoxy resin, adding to this resin a material reactive therewith such as a polyhydroxyl material (e.g., bisphenol A, cresols, or other phenols), optionally adding other ingredients such as advancement catalysts and the like and then advancing this composition to a solid state by heating for periods of usually ½–4 hours at temperatures usually in the range of about 250°–400° F. Thereafter, the solid advanced resin is usually formulated into a varnish solution containing an appropriate solvent or mixture of solvents, a curing agent, accelerator and other ingredients as desired. This solution is then used to impregnate some appropriate material and is then B-staged and subsequently press cured to produce the desired final product. While acceptable from an end result standpoint, the art process does suffer the disadvantage of requiring long advancing times resulting in economic waste.

SUMMARY OF THE INVENTION

It has now been discovered that liquid epoxy resins can be used directly in a process whereby advancement, B-staging and, if desired, curing are made to occur simultaneously in a relatively short period of time without deleteriously affecting the properties of the final product. The invention thus has two aspects; novel compositions are supplied for a novel process which eliminates the need for first preparing a solid resin and isolating it for subsequent use. This results in significant time savings by eliminating the long advancement time, heretofore required.

THE PROCESS

The process of the invention involves forming a solution of normally a liquid epoxy resin, a hydroxyl containing compound reactable therewith at elevated temperatures, a curing agent and optionally an accelerator therefor, applying the solution to the material to be impregnated, or coated, and subjecting the treated material to an elevated temperature for a time sufficient to effect B-staging of the material, as where laminates are subsequently desired, or to effect fully cured material as where coatings are desired. Due to the unique discovery of the invention, the overall time used in producing these materials is much shorter than the present state of the art since the solid resin is made in situ and is not isolated. Thus, the invention eliminates the need for any separate advancement step.

THE SOLUTION

The epoxy resin solution used in the process of the invention comprises any normally low molecular weight epoxy resin which is used in the art as a precursor to advanced solid resins. Preferred for use are normally liquid resins prepared from epichlorohydrin or epibromohydrin and a polyhydric alcohol. The production of such resins is well within the skill of the art. Typically liquid epoxides having an epoxy value of from about 0.3 eq./100 g. to 1.5 eq./100 g. and preferably 0.45 to 0.59 eq./100 g are suitable. Suitable epoxides are produced from epichlorohydrin and polyhydroxyl materials such as bisphenol A, (2,2-bis[4-hydroxyphenyl]propane), resorcinol, catechol, 1,2,6-hexanetriol, sorbitol, mannitol, pentaerythritol, trimethylol propane, and glycerol allyl ether. Other polymeric materials containing polyhydric hydroxyls such as appropriately substituted polyethers and polyesters may likewise be employed. For example, there may be employed vinyl cyclohexene dioxide, epoxidized mono-, di- and triglycerides, butadiene dioxide, 1,4-bis(2,3-epoxypropoxy) benzene 1,3-bis(2,3-epoxypropoxy) benzene, 4,4'-bis(2,3-epoxypropoxy)diphenyl ether, 1,8-bis(2,3-epoxypropoxy) octane, 1,4-bis(2,3-epoxypropoxy) cyclohexane, 4,4'-bis(2-hydroxy-3,4-epoxybutoxy) diphenyldimethylmethane, 1,3-bis(4,5-epoxypentoxy)-5-chlorobenzene, 1,4-bis(3,4-epoxybutoxy)2-chlorocyclohexane, diglycidyl thioether, diglycidyl ether, ethylene glycol diglycidyl ether, resorcinol diglycidyl ether, 1,2,5,6-diepoxyhexane and 1,2,3,4-tetra(2-hydroxy-3,4-epoxy butoxy) butane.

Especially suitable are bisphenol A epichlorohydrin polyepoxide resins of the formula:

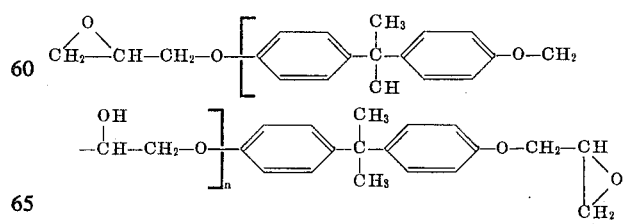

and epoxidized poly(o-cresols) of the formula:

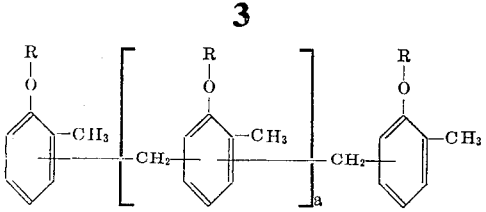

$n$ and $a$ are positive numbers, and R represents primarily glycidyl groups but may also represent chlorohydrins, glycols, polymeric ether linkages and the like. Such resins may also carry chloro or bromo substituents.

The hydroxyl containing material used in the present invention may be any of the hydroxy materials normally used in the art processes whereby advancement of the liquid resin to the solid resin is effected in such processes. Normally, this material will be the same as that used to produce the liquid epoxy resin itself. Thus, for example, liquid epoxy resins prepared from epichlorohydrin and bisphenol A are conveniently advanced in the art processes with more bisphenol A. Other polyhydroxyl materials useful are those set forth herein above as well as tetrabromo bisphenol A, phenol novolacs and cresol novolacs. The present process contemplates utilizing such additional polyhydroxyl materials in the solution together with the liquid resin. Halogenated polyhydroxyl materials are also contemplated.

As regards the relative amount of liquid resin and polyhydroxyl materials employed, these will depend to a large extent on the physical properties sought for the end product. Therefore, according to this invention, one may employ from 60–85 percent of liquid resin and 40–15 percent of polyhydroxyl material and, preferably, 75–80 percent and 25–20 percent respectively. Such preferred amounts, when used with the preferred ingredients recited herein give quite satisfactory coatings for use in fiberglass laminated preparations.

The epoxy resin solution additionally contains a curing agent. Curing agents (or hardeners as they are also known) which effect polymerization of the epoxide by reaction of the oxirane ring are suitable herein. Preferred for use herein are guanidines such as tetramethylguanidine and dicyandiamide and biguanides such as 2,6-xylene biguanide. Dicyandiamide is most preferred herein and may be employed without the further addition of advancement catalysts. It is preferred that the curing agents used be those which exert their curing effect at elevated temperatures rather than at room temperatures. The amount of curing agent employed will vary depending upon the particular compositions employed, but for the preferred system wherein dicyandiamide is employed, an amount ranging from one to 10, and preferably two to six parts per hundred parts by weight of resin is suitable.

In addition to the above ingredients, the epoxy resin solution may contain an accelerator to aid in the subsequent polymerization reaction. Such compounds as are normally used in the art may be employed. For example, typically imidazoles, isonizide, tetramethyl diamine, benzyl dimethylamine, metaphenylene diamine, and N,N,N'N'-tetramethyl-1-3-butanediamine (TMBDA) may be used. The amount employed is much less than the curing agent, usually of the order of 0.0 to 0.7 phr. and preferably, 0.2 to 0.5 phr.

The solution of the invention may also contain the usual advancement catalyst. Materials such as alkali or alkaline earth metal alkoxides, carbonates, phosphates, hydroxides, or imidazoles or quaternary phosphonium salts and the like may be used. The advancement catalyst may be present in an amount of from about 0 to 2,000 ppm. based on the weight of epoxy resin used. Preferably from 10–200 ppm. and most preferably 20–75 ppm. are employed. In the present invention, such materials function as accelerators.

Other ingredients may be included as desired in the epoxy resin solutions such as wetting agents, colorants, fillers and the like.

The solvents employed as the vehicle for the epoxy resin solution will depend of course on the particular solutes employed, but in general ketones, such as acetone and methyl ethyl ketone; dimethyl formamide, water, n-butanol, and methyl cellosolve are suitable. Acetone is especially preferred as a main solvent. When dicyandiamide is employed, appropriate solubilizing agents therefor, as are known in the art should be used. Typically dimethyl formamide, water and methyl cellosolve are suitable. The amount of solvent employed should be such as to give a viscosity which is conveniently handled depending upon the subsequent impregnation or coating treatment to be used. Ordinarily for impregnating standard fiberglass cloth, solutions having a solids content of from 50 to 80 percent and preferably 55 to 75 percent is suitable. The term "solids content" has reference to the percentage of weight of the solution contributed by the liquid resin together with other non-volatile materials. If desired, additional filler materials or thixotropic agents can be used. Good results are obtained from solutions which contain from 60 to 85 percent of liquid resin, 40 to 15 percent of the hydroxyl material, 0 to 2,000 ppm. of advancement catalysts, 1 to 10 parts of curing agent and 0.0 to 0.7 parts accelerator all in a solvent solution wherein the solids content is from 55 to 75 percent.

IMPREGNATION

Once the solution is formed, the benefits of the invention are obtained by impregnating the desired substrate with a suitable amount of the solution and subjecting the treated material to an elevated temperature to effect simultaneous advancement of the liquid resin and "B" staging or curing. The type of material employed as the substrate and the amount of resin solution applied will, of course, depend upon the ultimate use of the final product. As stated previously, however, the present invention is eminently suited to the impregnation of fiberglass cloth for use in the production of various laminates. Such laminates find use primarily in the manufacture of printed circuit boards. Other materials, both natural and synthetic, such as wool, cotton, nylon, dacron and the like may be used as substrates for impregnation. Additionally non-porous materials may also be used where coatings or adhesive applications are desired. For example, metals such as steel, galvanized steel, tin plated steel, aluminum, wood, plastics and the like are all suitable. The term "impregnate" as used herein is meant to apply to the application of the solution to porous and non-porous materials.

Conventional equipment may be used to apply a predetermined amount of the resin solution to the substrate with due consideration given to sound engineering practice and economic procedures. Thus, conditions of type of cloth used, cloth speed through the solution, replenishment of spent solutions, solvent flash-off during "B" staging and the like are all within the skill of the art.

After the desired amount of resin solution has been applied, the impregnated material which in the preferred operation is a precursor to a laminated structure and thus may be called a pre-laminate, is subjected to B-staging in the laminate production. The conditions of time and temperature employed to effect B-staging will vary to some extent depending upon the particular resin solutions used. Indeed, some resins may not B-stage at all, but rather will be fully cured. This is particularly true in using resins for coating applications. The benefits of the invention are obtained however, because much less time will be required than if the conventional technique of advancing and isolating the resin prior to use is employed. Here, the simultaneous advancing and B-staging results in no deleterious effect on the properties of the cured product and indeed spares the art considerable expense. Typically, the B-staging is effected at preferably 275°–375° F. for periods of preferably 2 –20 minutes. Subsequent curing, if desired, can be effected at these temperatures as well.

The products thus obtained, have physical and electrical properties comparable to those obtained by other methods. This is usually manifested in desirable characteristics of adhesion to surfaces, impact strength, chemical resistance, rigidity and the like. Of course, any one or more of these properties may be unnecessary depending upon the specific application.

The following examples are given to illustrate specific embodiments of the invention.

EXAMPLE I

A total of 500 gms. of a well-blended mixture (mixture A) obtained from 1000 gms. of a liquid epoxy resin (epoxy value = 0.53 eq./100 g.) and 0.04 gms. of 2-phenylimidazole is blended in a shaker with 142 gms. of bisphenol A and 159 gms. of acetone to obtain mixture B. To 125 gms. of the mixture B is added 55 gms. of acetone, 21 gms. dimethyl formamide and 0.2 gms. of benzydimethylamine to obtain solution C. A 3 mil. drawdown of solution C is coated onto a steel 4 inch × 12 inches Q panel. The resulting coated panel is cured for 20 minutes at 375° F. and yields a coating having good resistance to solvent (methyl ethyl ketone).

The above solution has a gel time of 229 seconds as determined by the following procedure:

A cure plate is heated to (340° F. ± 0.9° F.) and coated with a thin film of a silicone release agent. 3.5 gms. 0.1 gm. of test sample is spread lightly in a 2 inch × 2 inch square section on the cure plate with a back-and-forth movement using a spatula. When the viscosity of the material increases, as noted by drag on the spatula, the spatula is removed. The point at which the material does not string but comes up in a film when the spatula is lifted is the end point. The time from the start is noted.

It will be appreciated by those skilled in the art, that the gel time obtained on the material described above compares favorably with that obtained on systems produced in accordance with prior art techniques.

The liquid epoxy resin used herein is produced from epichlorohydrin and bisphenol A, has an epoxy value of 0.53 eq./100 gms. and is obtainable from CIBA Products Co., Summit, New Jersey under the name ARALDITE 6010.

A similar formulation, using a novalac, (a cresol formaldehyde resin, softening point 97° C., hydroxyl value 8.2 eg./kg.) instead of the bisphenol A, results in a film which possesses good methyl ethyl ketone resistance.

EXAMPLE II

The following composition is prepared.
77.9 gms. ARALDITE 6010
2211 gms. bisphenol A
40.0 gms. dicyandiamide solution (4 gms. dicyandiamide, 36.0 gms. methyl cellosolve)
0.2 gms. benzyldimethylamine
15.2 gms. methyl cellosolve
2.5 gms. deionized water
2.5 gms. n-butanol
1.25 gms. SR–82 (Silicon Resin supplied by General Electric)

The above composition, which contains no advancement catalyst, is used to form a 3 mil. (wet) drawdown on a steel 4 inch × 12 inch Q panel. The film is cured at 375° F. for 20 minutes and exhibits good impact strength (pass 100 pounds — inches, fail 120 pounds — inches on the Gardner scale) and good resistance to methyl ethyl ketone. The gel time obtained in accordance with the method described in Example I is 274 seconds. This compares favorably with the formulation of Example I.

EXAMPLE III

The following solutions are prepared (A represents the art process and B the process of the invention):

| A | B |
|---|---|
| 125 gms. of 80% solution of epoxy resin**in acetone | 77.9 gms. resin (Mixture A of Example I |
| 15 gms. additional acetone | 22.1 gms. bisphenol A |
| 40 gms. of 10% solution of dicyandiamide in 50/50 mixture of methyl cellosolve/DMF | 40.0 gms. dicyandiamide solution (4 gms. dicyandiamide, 36 gms. methyl cellosolve) |
| 0.2 gms. benzyldimethylamine | 0.2 gms. benzyldimethylamine |
| | 15.2 gms. methyl cellosolve |
| | 2.5 gms. deionized water |
| | 2.5 gms. n-butanol |
| | 3.2 gms. Cab-o-Sil |

Each solution was used to impregnate fiberglass cloth (Type 1528 - Volan A from J. P Stevens Co.) to a total pickup level of 40% for A and 44% for B as measured after heating at 325°F. for 10 and 5 min. respectively. Nine plys of prepeg prepared from each system were then laminated along with the desired weight copper and cured at 350°F. for one-half hour at 500 psi.
**Araldite 7065, a solid epoxy resin having an epoxy value in the range of 0.20 - 0.22 eq./10 g. and a Duran Softening Point of 75-85°C, is the epoxy resin used herein.

Both laminates passed the following specifications of the National Electrical Manufactures for G–10 epoxy resins: solder float (both etched and unetched specimens); oven blister test and solvent resistance.

In other properties, the laminates produced using the process of the invention compare favorably to those produced using the art process. Table I below shows the NEMA specification for the property and those obtained with the laminate produced according to the art process (A) and those obtained using the process of the invention (B).

TABLE I

| Property | NEMA Specification | Laminate A | Laminate B |
|---|---|---|---|
| Peel Strength, min., lbs. per in. width | | | |
| a) One ounce copper after solder float | 8 | 10 | 10.5 |
| b) Two ounce copper after solder float | 10 | 15 | 15.2 |
| Water Absorption Average Maximum Percent | 0.25 | 0.12 | 0.11 |
| Flexural Strength, min. KSI | | | |
| a) Lengthwise | 60 | 67 | 67 |
| b) Crosswise | 50 | 55 | 52 |

As can be seen from the above, the process of the present invention yields laminates (B) which are virtually identical to those produced in the manner of the art (laminates A).

In other tests, comparisons were made to determine the degree of B-staging achieved by the solution used to prepare laminate B and the solution used to produce laminate A. In such tests, it is demonstrated that the process of the present invention results in a material which is B-staged faster than the material produced according to the art. Typically, B-staging is substantially complete in the inventive processing materials within 7 minutes at 325° F. (to reach approximately 2 percent flow) whereas approximately 13 minutes at 325° F. are required for the art processed material. This, of course, is in addition to the several hours advancement at 250° F. or higher that the art material requires, whereas, no such advancement is required for the instant materials.

What is claimed is:

1. A composition comprising in a solvent system a mixture of a liquid 1,2-epoxy resin, from 15–40 percent by weight of said mixture of a polyhydroxyl material reactable therewith at elevated temperatures, selected from the group consisting of bis-phenol A, tetrabromobisphenol A, phenol novolac, cresol novolac, resorcinol, catechol, 1,2,6-hexanetriol, sorbitol, mannitol, pentaerythritol, trimethylolpropane, glycerol allyl ether, polyethers, and polyesters, and as a hardener 1–10 parts per hundred parts of resin of a guanidine selected from the group consisting of guanidine, tetramethylguanidine, dicyandiamide and 2,6-xylenebiguanide, with or without an accelerator.

2. The composition of claim 1 wherein the hardener is dicyandiamide.

3. The composition of claim 1 wherein there is present an accelerator capable of accelerating a reaction between the resin, the polyhydroxyl material and the hardener.

4. The composition of claim 2 wherein the liquid epoxy resin is the reaction product of epichlorohydrin and 2,2-bis(4-hydroxyphenyl)propane.

5. The composition of claim 4 wherein the epoxy resin has an epoxy value of from 0.3 to 1.5 equivalents per 100 grams.

6. The composition of claim 3 wherein the accelerator is benzyldimethylamide.

7. The composition of claim 1 wherein said mixture constitutes from about 50 – 80 percent by weight of said composition and in said mixture the liquid resin constitutes from about 60 – 85 percent by weight thereof, the polyhydroxyl material constitutes from 40 – 15 percent by weight thereof, and the hardener is present in from 1 – 10 parts per hundred parts of resin the remainder of said composition being the solvent system.

8. The composition of claim 7 wherein there is additionally present up to 0.7 parts of an accelerator defined in claim 3, per hundred parts of resin.

9. The composition of claim 3 wherein the polyhydroxyl material is halogenated.

10. The composition of claim 9 wherein the polyhydroxyl material is tetrabromo bisphenol A.

* * * * *

PO-1050
(5/69)

UNITED STATES PATENT OFFICE
CERTIFICATE OF CORRECTION

D

CASE CNY-57

Patent No. 3,687,894                    Dated September 29, 1972

Inventor(s) WILLIAM G. COLLINGS ET AL

It is certified that error appears in the above-identified patent and that said Letters Patent are hereby corrected as shown below:

Cover page, after the Inventors and before "[22]"

insert --- Assignors to CIBA-GEIGY Corporation,

Ardsley, New York ---.

Signed and sealed this 17th day of April 1973.

(SEAL)
Attest:

EDWARD M. FLETCHER, JR.                 ROBERT GOTTSCHALK
Attesting Officer                       Commissioner of Patents